May 18, 1965

J. E. DAVIS 3,184,610

POLARIZED SWITCHING DEVICE

Filed Aug. 30, 1962

JOHN EUGENE DAVIS
INVENTOR

BY Killman, Smith & Lamb
ATTORNEYS 3,184,610
POLARIZED SWITCHING DEVICE
John Eugene Davis, Baltimore, Md., assignor to The Bendix Corporation, Towson, Md., a corporation of Delaware
Filed Aug. 30, 1962, Ser. No. 220,496
3 Claims. (Cl. 307—88.5)

The present invention relates to switching devices. More particularly it relates to a solid state equivalent of an electromagnetic polarized relay.

Polarized relays are used extensively in telegraph circuits as repeaters and for the purpose of converting between various types of line connections. For example, polarized relays may be used for polar to neutral conversions with local neutral or line batteries or for conversions from neutral to polar operation using local polar or line polar batteries. The relays most widely used employ a moving armature for switching a contact arm between two stationary contacts to establish the desired circuit connections. Such relays are not regarded as unreliable devices but they do require periodic maintenance to adjust for armature bearing wear, spring tension variation and for contact cleaning.

One object of the present invention is to provide a switching device equivalent to a relay but which has no moving parts to cause variation in operation through wear or friction.

Another object of the invention is to provide a polarized switching device which has no movable contacts, thus eliminating contact corrosion and realizing a further advantage in the elimination of radiation likely to arise from arcing contacts.

A further object is to provide an entirely electronic switching device which is the full equivalent of a polarized electromagnetic relay having a single pole, double throw switch.

Still another object is to provide a polarized switching device which may be produced at lower cost than existing relays.

An additional object is to provide a switching device requiring no adjustment or other maintenance either during its manufacture or its lifetime.

Another object is to provide a switching device capable of rapid operation and possessing high current handling ability.

Other objects and advantages will become apparent as an understanding of the invention is gained through study of the following detailed description and the accompanying drawings.

Briefly, the invention comprises the combination of a saturable transformer and a pair of controlled rectifiers. The controlled rectifiers are solid state elements which exhibit the characteristics of thyratrons. Rapid switching action, comparatively low internal resistance and high reliability are among the advantages provided.

Figure 1:
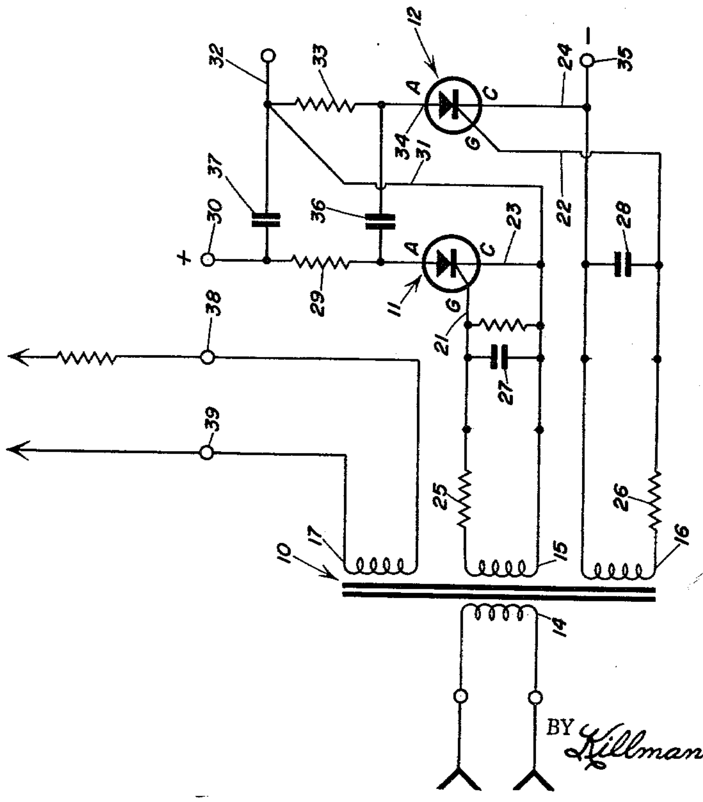
FIG. 1 is a schematic diagram of the invention.

Referring to FIG. 1 the present invention comprises a transformer 10 and a pair of semi-conductor switching elements 11, 12 of the silicon controlled rectifier type. The core of transformer 10 is of saturable magnetic material exhibiting rectangular hysteresis loop characteristics and is preferably of toroidal form. An input winding 14, two control windings 15, 16 and a bias winding 17 complete the transformer 10. Oppositely phased ends of control windings 15 and 16 are connected to the gate electrodes 21 and 22 of rectifiers 11 and 12. The cathodes 23 and 24 of the rectifiers are returned to the remaining ends of windings 15 and 16. Protective networks including current limiting resistors 25 and 26 and capacitors 27 and 28 are connected in circiut with the control windings. Capacitors 27 and 28 filter fast transients to prevent undesired triggering of rectifiers 11 and 12.

The anode of rectifier 11 is connected through a current limiting resistor 29 to a positive supply terminal 30. The cathode 23 of rectifier 11 is connected through line 31 to an output terminal 32 to which the anode 34 of rectifier 12 is also connected through a current limiting resistor 33. The cathode 24 of rectifier 12 is connected to a negative supply terminal 35. A commutating capacitor 36 is connected between the anodes of rectifiers 11 and 12 to cause conduction in one of the rectifiers to be extinguished upon initiation of conduction in the other rectifier. The rectifier switching into conduction should present a very low A.C. impedance to ground to insure the most effective commutator action. This low impedance path is provided by a capacitor 37 bypassing resistor 29. The cathode of rectifier 12 is connected directly to a battery, which possesses low A.C. impedance to ground, consequently resistor 33 does not require bypassing. External batteries are connected to terminals 32 and 35 as shown in the equivalent switching diagrams of FIGS. 2–4. The external batteries are arranged in various configurations for supplying energy to a load connected between output terminal 32 and the battery common. An external battery is also connected to terminals 38 and 39 of bias winding 17 to cause reversal of the core flux of transformer 10 when the input is received from a neutral line.

The function of bias winding 17 can be more fully appreciated by considering the operation of the switching device with polar input signals. Polar signals imply that a mark condition is differentiated from a space condition by a reversal of line current. With an input current pulse in one direction the core of transformer 10 rapidly saturates producing a sharp positive voltage spike on one of the control windings, say winding 15, which triggers rectifier 11 into conduction. The controlled rectifiers 11 and 12 are analogous to thyratrons in that the gate electrode loses control of the rectifier once conduction is established. Thus, it may be assumed that rectifier 12 is conducting at the time a positive voltage impulse is applied to the gate electrode of rectifier 11. The opposite phasing of windings 15 and 16 causes a negative impulse to be applied simultaneously to the gate electrode of rectifier 12. But the negative impulse to rectifier 12 does not extinguish conduction in that device because of the loss of gate control. Instead, the sudden discharge of capacitor 36 momentarily reverses bias rectifier 12 and interrupts conduction. The rectifiers exchange states with rectifier 11 now conducting and rectifier 12 now being non-conductive. Upon reversal of line current, a positive voltage will be applied to the gate electrode of rectifier 12 switching it into conduction and rectifier 11 will be switched into non-conduction, again through the action of capacitor 36.

A neutral line signal consists of interruptions in a unidirectional current. Since the first signal impulse drives the core of transformer 10 into saturation, except for the bias winding 17, subsequent interruption and reapplication of signal current would induce no gate control voltage. The bias winding, however, forces a reversal of core flux upon signal current interruption, thereby producing the required alternation in conductivity of rectifiers 11 and 12 upon signal current make and break.

The rectangular hysteresis characteristics of the core material of transformer 10 provides sharp control waveforms at windings 15 and 16 even when the signal waveform at winding 14 is distorted far from the ideal rectangular shape. Thus, a signalling rate adequate for all commercial telegraph operations is readily attained. Distorted signals can be reshaped and further transmitted or directly utilized. The combination of a saturable core transformer with controlled rectifiers which do not require continuous application of voltage to the gate electrode to maintain conduction, provides a highly sensitive switching device capable of tolerating substantial noise and distortion of the input signal.

Polar signals are often afflicted with fading or drop outs which do not amount to a reversal of current, but simply a disappearance of signal. Conventional polar relays are not responsive to such noise because a reversal of current is required to differentiate mark from space signals. The square loop material provides equivalent operation in the present invention.

Figure 2:
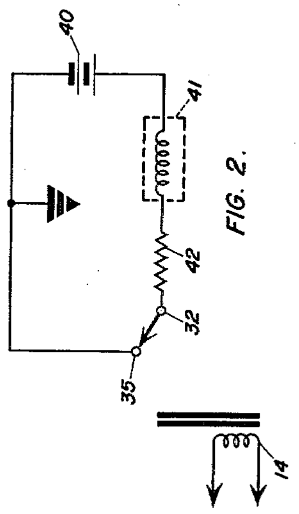
FIG. 2 is a schematic diagram illustrating the invention connected for polar to neutral conversion, with the invention being shown as a relay equivalent.
Figure 3:
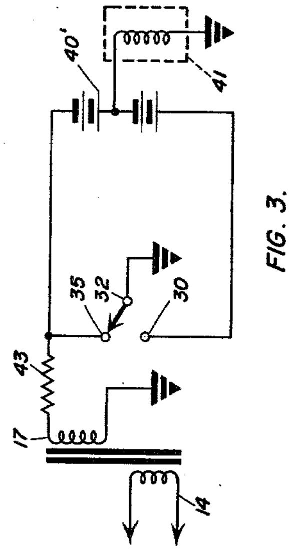
FIG. 3 is a diagram similar to FIG 2, except that connection is shown for neutral to polar conversion.
Figure 4:
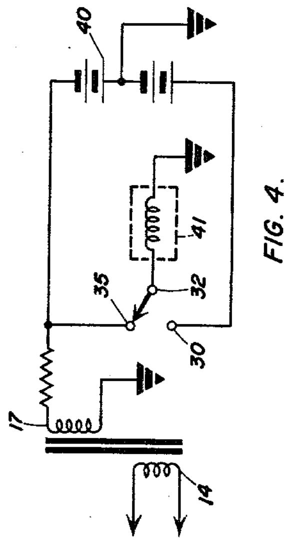
FIG. 4 is a diagram similar to FIG. 3, except for an alternative load and battery connection.

FIGS. 2–4 illustrate schematically the relay equivalents of various connections of the invention to external apparatus. In FIG. 2, connection is made for polar to neutral conversion. The grounded negative terminal of an external battery is connected to terminal 35, the cathode of rectifier 12, FIG. 1. The positive terminal of battery 40 is connected through an external load 41 and current limiting resistor 42 to the output terminal 32 of FIG. 1. Polar input signals are applied to winding 14 of transformer 10, FIG. 1. The external load 41 may be the selector magnet of a teletypewriter.

FIG. 3 illustrates connections for neutral to polar conversion. The external battery 40′ comprises series connected cells, the negative terminal of which is connected to terminal 35 and the positive terminal of which is connected to terminal 30. The external load 41′ is connected between an intermediate terminal of battery 40′ and ground. Output terminal 32 is grounded and neutral signals are supplied to input winding 14. It is necessary for this operation to energize bias winding 17, which is done by connecting the winding through a resistor 43 to one of the terminals of battery 40′. This connection is convenient for repeater use since the battery and load may be located some distance from the switching device. In FIG. 4, the load 41 has been connected from output terminal 32 to ground and the intermediate tap of battery 40′ has been grounded. This connection serves for neutral to polar conversion as in FIG. 3, and is best suited for battery or load locations close to the switching device.

Modifications and variations of the invention are possible in the light of the above teachings. It should therefore be understood that within the scope of the appended claims the invention may be practiced otherwise than as specifically disclosed.

The invention claimed is:

1. A switching device for controlling the direction of current from a voltage source through a load, comprising
   - a transformer having a core composed of saturable magnetic material of rectangular hysteresis characteristics,
   - an input winding on said core,
   - a pair of control windings on said core,
   - a pair of controlled rectifiers, said rectifiers each including anode, cathode and gate electrodes, said gate electrodes each receiving oppositely phased voltages from said control windings and rendering said rectifiers conductive for positive voltages,
   - an external voltage source having positive, negative, and common terminals,
   - means connecting the anode of one of said rectifiers to said positive terminal of said external voltage source,
   - means connecting the cathode of the other of said rectifiers to said negative terminal of said external voltage source;
   - means connecting the cathode of said one rectifier and the anode of said other rectifier to provide an output terminal for connection to a load connected to said voltage source common terminal; and
   - commutating means connecting the anodes of said rectifiers for rendering a conducting one of said rectifiers non-conductive upon the application of positive voltage to the gate electrode of said other rectifier.

2. A switching device providing polar output signals for neutral input signals comprising;
   - a transformer having a core composed of saturable magnetic material of rectangular hysteresis characteristics;
   - an input winding on said transformer for receiving neutral input signals;
   - a bias winding on said transformer, said bias winding being excited to magnetize said core oppositely from the direction of magnetization resulting from signals on said input winding;
   - a pair of control windings on said core;
   - a pair of controlled rectifiers each having gate, cathode and anode electrodes;
   - means applying oppositely phased voltages from said control windings to said gate electrodes;
   - means connecting the anode of one of said rectifiers to an external source of positive voltage;
   - means connecting the cathode of the other of said rectifiers to an external source of negative voltage;
   - a common output connection; means connecting the cathode of said one rectifier and the anode of said other rectifier to said output connection; and
   - commutating means connecting the anodes of said rectifiers for rendering a conducting one of said rectifiers non-conductive upon the application of positive voltage to the gate electrode of the other of said rectifiers.

3. A switching device as claimed in claim 2 wherein said commutating means comprises a capacitor.

References Cited by the Examiner

UNITED STATES PATENTS

| | | | |
|---|---|---|---|
| 3,041,475 | 6/62 | Fisher | 307—88.5 |
| 3,113,241 | 12/63 | Yonushka | 307—88.5 |
| 3,120,620 | 2/64 | Nowell | 307—88.5 |

ARTHUR GAUSS, *Primary Examiner.*